United States Patent [19]
Mane

[11] Patent Number: 5,920,165
[45] Date of Patent: Jul. 6, 1999

[54] BI-DIRECTIONAL MOTOR CONTROL INCORPORATING A DEFROSTER ELEMENT

[75] Inventor: H. Winston Mane, Farmington Hills, Mich.

[73] Assignee: UT Automotive Dearborn, Inc., Dearborn, Mich.

[21] Appl. No.: 09/058,068

[22] Filed: Apr. 9, 1998

[51] Int. Cl.⁶ ....................................................... H02P 1/22
[52] U.S. Cl. ........................... 318/293; 318/280; 318/444
[58] Field of Search ................................. 318/256, 280, 318/281, 282, 287, 291, 293, 443, 444; 15/250.05; 307/10.1

[56] References Cited

U.S. PATENT DOCUMENTS

| | | |
|---|---|---|
| 3,919,734 | 11/1975 | Mosley . |
| 4,037,286 | 7/1977 | Medearis et al. . |
| 4,109,133 | 8/1978 | Hanle et al. . |
| 4,387,290 | 6/1983 | Yasuda . |
| 5,010,289 | 4/1991 | Takada . |
| 5,386,098 | 1/1995 | Knudsen . |
| 5,694,812 | 12/1997 | Maue et al. . |
| 5,764,010 | 6/1998 | Maue et al. . |

*Primary Examiner*—Bentsu Ro
*Attorney, Agent, or Firm*—Howard & Howard

[57] ABSTRACT

A unique electrical control for a defroster has a resistive electrical filament strip and a bi-directional motor having a H-bridge drive. The defroster filament may be simultaneously operated to warm a window or mirror and function as a power or current dissipating resistance to prevent a short circuit within the H-bridge drive.

16 Claims, 2 Drawing Sheets

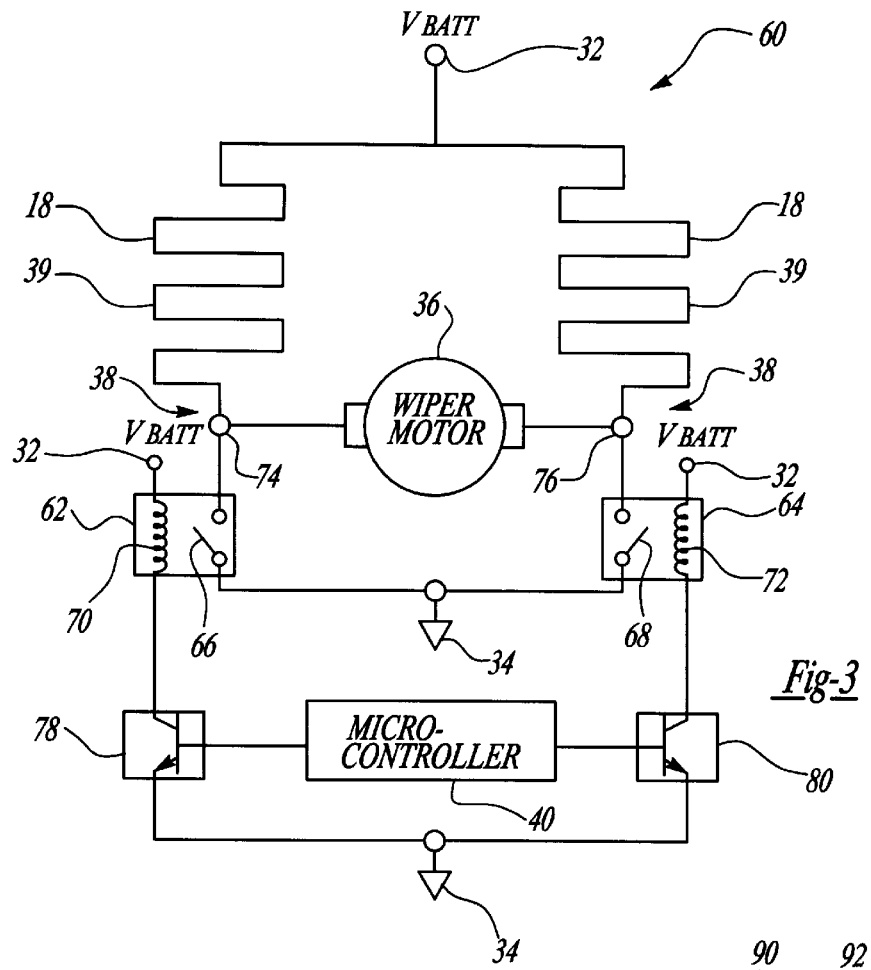
*Fig-3*
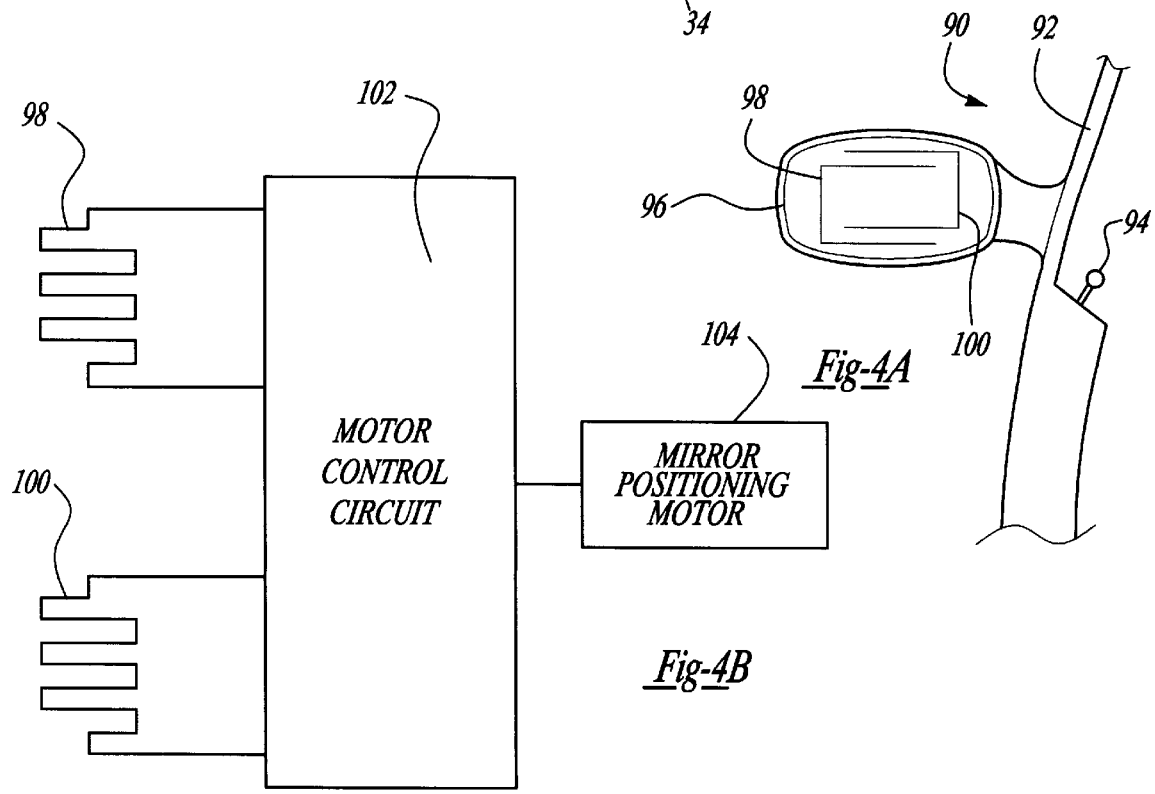
*Fig-4A*
*Fig-4B*

BI-DIRECTIONAL MOTOR CONTROL INCORPORATING A DEFROSTER ELEMENT

BACKGROUND OF THE INVENTION

This invention relates to an electrical control for a bi-directional motor which incorporates a defroster element.

Many modern vehicles include a rear window defroster and a rear window wiper. Typically, the rear window defroster consists of a power switch and a resistive electrical filament strip bonded to the inside of the rear window. One end of the resistive filament is connected to a power source and the opposite end of the resistive filament is connected to ground. When the defroster is switched on, current from the power source flows through the resistive filament to ground thereby warming the filament. The warm filament heats the rear window.

Many modern vehicles further include a single rear window wiper. A wiper arm is moved in a reciprocating motion across the rear window by a bi-directional motor. Typically, the bi-directional motor is driven with a H-bridge drive. The H-bridge drive operates to apply current in alternating directions across the motor. Prior art H-bridge drives have employed a variety of electrical components and have taught several different designs or lay-outs.

One particularly advantageous type of H-bridge uses a pair of current dissipating resistive elements. Typically, a pair of power resistors would be used. The power resistor could operate as a pull-up resistor connected in series between the current source and the motor or a pull-down resistor connected in series between the motor and ground. Power resistors dissipate power by giving off heat. This type of H-bridge has typically not been used for rear wiper motors, as the necessary power resistors would be too large to be practical. Thus, other H-bridge designs have been used which may have some undesirable characteristics.

In most modern vehicles, the rear window defroster and the rear window wiper system are packaged close to each other yet assembled and operated separately. It would be desirable to capitalize upon the packaging proximity and integrate the rear window defroster system and the rear window wiper system to reduce parts, conserve packaging space, decrease cost, and increase reliability. Further, it would be desirable to use the heat generated by the H-bridge drive to warm the rear window.

Side-view mirrors are also being provided with defroster elements and controls, and separate controls for positioning motors.

SUMMARY OF THE INVENTION

In a disclosed embodiment of this invention, a vehicle includes a power source, a bi-directional motor, and at least one resistive element attached to a planar surface of the vehicle and electrically connected to the power source. The resistive element is electrically connected to the motor for receiving current from the power source and providing electrical resistance to both warm the planar surface and to drive the motor.

In one embodiment the planar surface is a rear window. In another embodiment, the planar surface is a side view mirror. In the rear window embodiment, the motor is preferably a wiper motor. In the mirror embodiment the motor is preferably a mirror positioning motor.

In a preferred embodiment, the resistive element consists of a defroster filament strip bonded to the rear window or mirror. More preferably, there are two such resistive elements operating as both power resistors in an H-bridge for a motor.

Further, in a preferred embodiment, the vehicle includes a micro-controller and pair of normally-open switches, such as metal oxide semiconductor field-effect transistors, for controlling the operation of the defroster and the bi-directional motor.

A single control circuit thus replaces the prior art separate circuits for the defroster and the motor. Also, by using the resistive elements, the type of H-bridge which requires power resistors becomes practical. The resistive elements, which are part of the defroster function, operate as the power resistors.

These and other features of the present invention will be best understood from the following specification and drawings, the following of which is a brief description.

BRIEF DESCRIPTION OF THE DRAWINGS

FIG. 3 is an electrical schematic diagram of an alternative embodiment of the electrical system according to the present invention for controlling the rear window defroster and rear window wiper.

FIG. 4A shows a schematic view of a second embodiment.

FIG. 4B shows the controls for the second embodiment.

DETAILED DESCRIPTION OF THE PREFERRED EMBODIMENT

Figure 1:
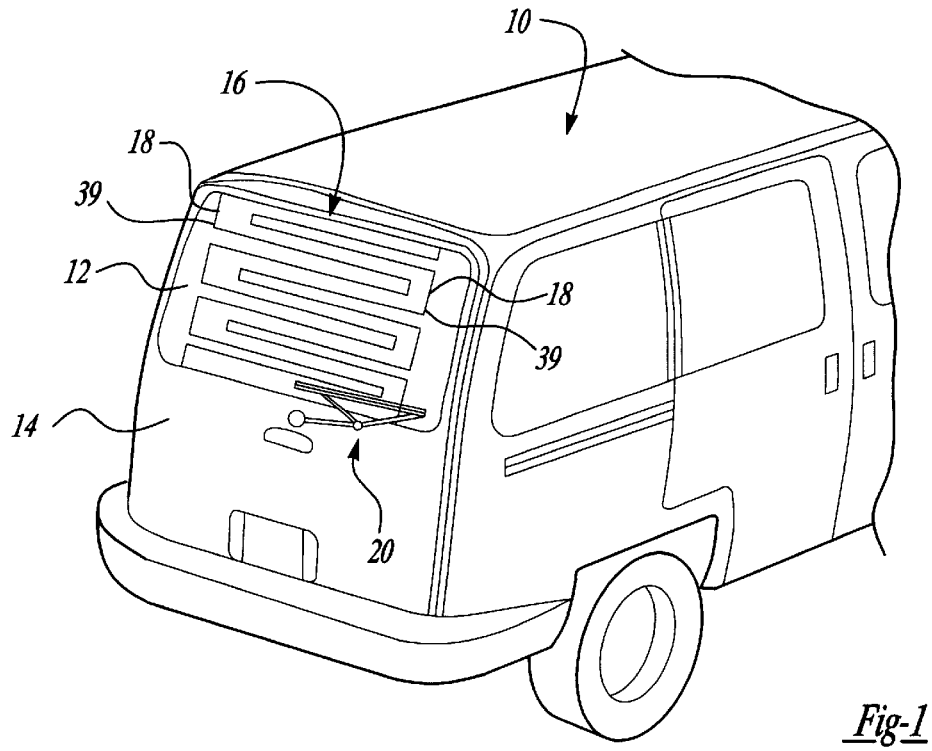
FIG. 1 is a perspective rear view of a vehicle having a rear window defroster and rear window wiper.

FIG. 1 is a perspective rear view of a vehicle 10 having a rear window 12 and liftgate 14. A rear window defroster 16 consisting of at least one resistive electrical element 18 is bonded to the rear window 12. As shown, in a preferred embodiment there are two resistive elements 18, arranged in a manner such that both extend across the rear window 12. The rear window defroster 16 operates to warm the resistive elements 18 and remove frost, ice, etc. from the rear window 12. To remove rain and snow from the rear window 12, the vehicle 10 further includes a rear window wiper 20.

Figure 2:
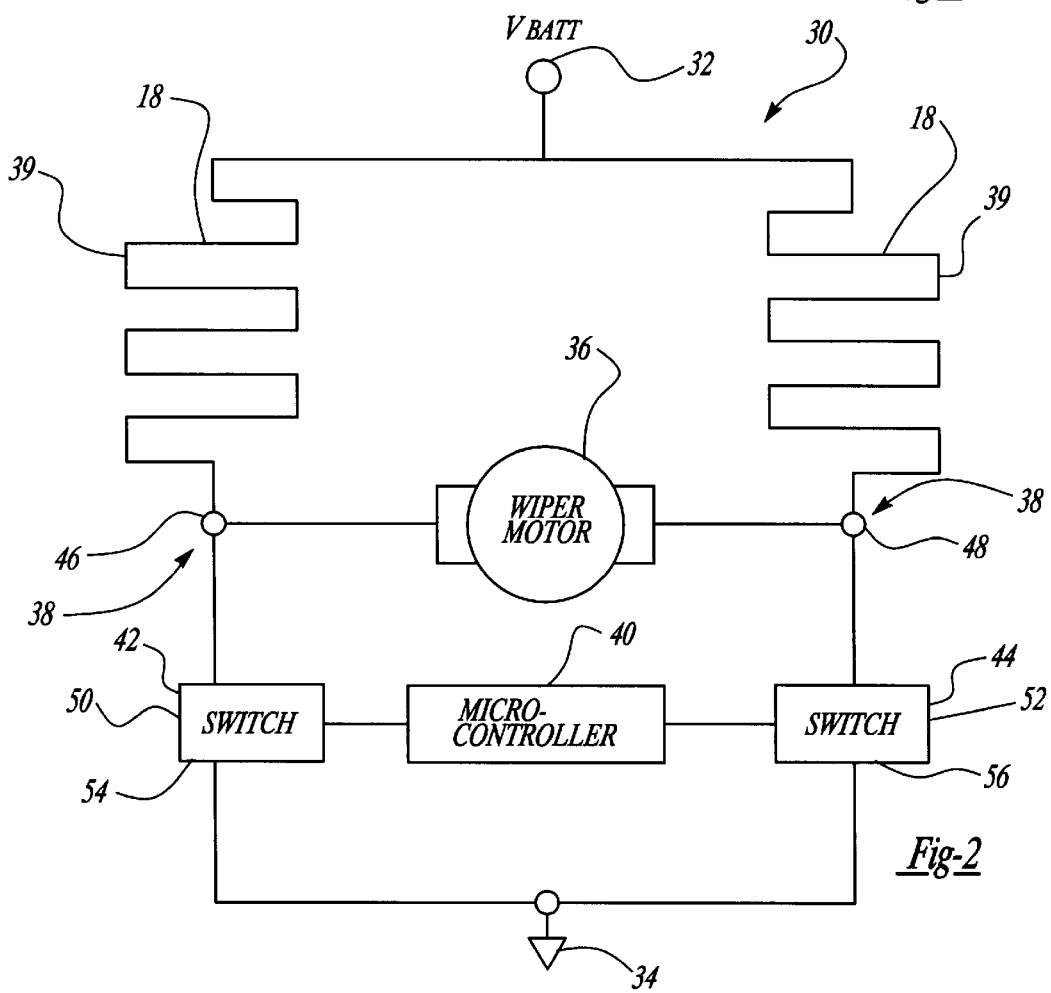
FIG. 2 is an electrical schematic diagram of an electrical system according to the present invention for controlling the rear window defroster and rear window wiper.

FIG. 2 is an electrical schematic diagram of an electrical system 30 according to the present invention for controlling the rear window defroster 16 and rear window wiper 20. The electrical system 30 includes a power source 32 and a ground 34. To operate the rear window defroster 16, preferably the resistive elements 18 are each connected between the power source 32 and ground 34.

The arm of the rear window wiper 20 is moved in a reciprocating motion across the rear window 12 by a bi-directional wiper motor 36. One of ordinary skill in the art will recognize the bi-directional wiper motor 36 may be a D.C. permanent magnet fractional horsepower motor used to operate the rear window wiper 20. One such motor is known which not only drives the wiper but also locks and unlocks the liftgate 14, and also releases the rear window 12. However, this invention extends to simple wiper motor controls. The bi-directional wiper motor 36 is driven with a H-bridge drive 38. The H-bridge drive 38 applies current from the power source 32 in alternating directions across the bi-directional wiper motor 36 to ground 34. To reduce parts, conserve packaging space, decrease cost, increase reliability, and efficiently use the heat generated by power or current dissipating resistance in the H-bridge drive 38, the resistive elements 18 are further electrically connected to the bi-directional wiper motor 36 to receive current from the power source 32 and provide power or current dissipating resistance to both warm the rear window 12 and to drive the bi-directional wiper motor 36.

In a preferred embodiment of the present invention, the resistive elements 18 consist of defroster filament strips 39 bonded to the inside surface of the rear window 12. As shown in FIG. 1, the defroster filament strips 39 preferably both extend repetitively back and forth across the rear window 12.

The electrical system 30 further includes a micro-controller 40 for controlling the path of current from the power supply 32 through the resistive elements 18 and the bi-directional wiper motor 36 to warm the rear window 12 and to drive the bi-directional wiper motor 36 in alternating directions. A pair of normally-open switches 42 and 44 are electrically connected in series between each wiper motor/resistive element splice 46 and 48 and ground 34 respectively for selectively switching opposite ends of the bi-directional wiper motor 36 to ground 34. The micro-controller 40 is electrically connected to the switches 42 and 44 to selectively close each of the switches 42 and 44. When both switches 42 and 44 are open, neither the defroster nor rear wiper is activated. To operate the defroster only, the micro-controller 40 closes both switches 42 and 44. To run the wiper motor 36 in a clockwise direction, the micro-controller 40 closes only switch 44. To run the wiper motor 36 in a counter-clockwise direction, the micro-controller 40 closes only switch 42. Any time current is run through one resistive element 18, that resistive element 18 warms and defrosts the rear window 12.

In a preferred embodiment of the present invention, the micro-controller 40 is programmed to activate the full defroster function by closing both the switches 42 and 44 during the pause portion of an intermittent wipe sequence. When both the switches 42 and 44 are closed, the bi-directional wiper motor 36 is dynamically braked. In this condition, both resistive elements 18 are electrically placed in parallel to achieve the full defroster function.

The H-bridge drive 38 consists of five leg portions. The first leg consists of the resistive element 18 connected between the power source 32 and the splice 46; the second leg consists of the resistive element 18 connected between the power source 32 and the splice 48; the third leg consists of the switch 42 connected between the splice 46 and ground 34; the fourth leg consists of the switch 44 connected between the splice 48 and ground 34; and the fifth leg consists of the bi-directional wiper motor 36 connected between the splices 46 and 48. The design of the disclosed H-bridge drive 38 requires that a power or current dissipating resistance be connected in series between the power source 32 and the bi-directional motor 36 to prevent a short circuit during operation of the rear window wiper 20. Specifically, the resistive element 18 connected between the power source 32 and the splice 46 is necessary to prevent a short circuit when the switch 42 is closed. Similarly, the resistive element 18 connected between the power source 32 and the splice 48 is necessary to prevent a short circuit when the switch 44 is closed.

Since the resistive elements 18 are cyclically turned on and off with the reversing motor 36, the application of heat to the rear window 12 from each resistive element 18 will also start and stop. It is for this reason that both resistive elements 18 extend back and forth across the entire rear window 12.

In a preferred embodiment of the present invention, the switches 42 and 44 consist of a pair of MOSFETs (metal oxide semiconductor field-effect transistors) 50 and 52. The micro-controller 40 is electrically connected to the MOSFETs 50 and 52 for selectively powering each of the MOSFETs 50 and 52. Further details of operating a MOSFET as a switch are known by those skilled in the art and further explanation is believed to be unnecessary for illustration of the present invention.

In an alternative embodiment of the present invention, the switches 42 and 44 consist of a pair of bi-polar transistors 54 and 56. The micro-controller 40 is electrically connected to the bi-polar transistors 54 and 56 for selectively powering each of the transistors 54 and 56. Further details of operating a bi-polar transistor as a switch are known by those skilled in the art and further explanation is believed to be unnecessary for illustration of the present invention.

Although shown as pull-up resistors, one of ordinary skill in the art will recognize that the defroster filament strips 39 may function as pull-down resistors in a H-bridge drive used to control a bi-directional motor. This would simply require positioning strips 39 between splices 46 and 48 and ground 34.

FIG. 3 is an electrical schematic diagram of an alternative embodiment of the electrical system 60 according to the present invention for controlling the rear window defroster 16 and rear window wiper 20. The alternative embodiment electrical system 60 includes a pair of relays 62 and 64 having a switch 66 and 68 and a coil 70 and 72 respectively. The switch 66 of relay 62 is electrically connected in series between wiper motor/resistive element splice 74 and ground 34. The switch 68 of relay 64 is electrically connected in series between wiper motor/resistive element splice 76 and ground 34. A pair of NPN transistors 78 and 80 are electrically connected to the coil 70 and 72 of the relays 62 and 64 respectively for controlling the switches 66 and 68. The micro-controller 40 is electrically connected to the transistors 78 and 80 to selectively ground each coil 70 and 72 and close each switch 66 and 68 or, alternatively, open each coil 70 and 72 and open each switch 66 and 68. Further details of operating a NPN transistor to open and close a circuit are known by those skilled in the art and further explanation is believed to be unnecessary for illustration of the present invention. When both switches 66 and 68 are open, neither the defroster nor rear wiper is activated. To operate the defroster only, the micro-controller 40 closes both switches 66 and 68. To run the wiper motor 36 in a clockwise direction, the micro-controller 40 closes only switch 68. To run the wiper motor 36 in a counter-clockwise direction, the micro-controller 40 closes only switch 66. Any time current is run through one resistive element 18, that resistive element 18 warms and defrosts the rear window 12.

A detailed explanation of various H-bridge options is not deemed necessary here. However, what is important is that the H-bridge structures using the power resistors have operational benefits. By using the rear defroster system as the power resistors, this invention makes the using of this type of H-bridge practical. Also, this invention eliminates the need for two separate control circuits for the rear defroster and rear wiper systems.

Another embodiment 90 is shown somewhat schematically in FIG. 4A. A vehicle 92 has a mirror positioning control 94 for positioning a mirror 96. Mirror 96 is provided with two defroster filaments 98 and 100.

FIG. 4B shows filaments 98 and 100 connected into a control 102 for a mirror positioning motor 104. The filaments 98 and 100 may be incorporated into the motor control circuit 102 as in the previous embodiments. Also, as in the prior embodiment, only one filament need be used, with a normal resistor providing the other leg. Generally the mirror and rear windows could be said to be planar surfaces on the vehicle.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle comprising:
   a power source;
   a bi-directional motor for moving a vehicle component, and having a pair of terminals across said motor; and
   at least one resistive element attached to a planar surface of the vehicle and electrically connected to said power source;
   said resistive element electrically connected to said motor for receiving current from said power source and selectively providing electrical resistance to both warm said planar surface and to drive said motor.

2. A vehicle as set forth in claim 1 wherein said planar surface is a rear window, and said resistive element consists of a defroster filament strip attached to the inside surface of said window.

3. A vehicle as set forth in claim 2 wherein there are two of said defroster filament strips electrically connected to opposite motor terminals.

4. A vehicle as set forth in claim 3 wherein said defroster filament strips are further electrically connected to said power source to function as pull-up resistors.

5. A vehicle as set forth in claim 2 including a micro-controller for controlling the path of said current from said power supply through said resistive element and said motor to warm said window and to drive said motor in alternating directions.

6. A vehicle as set forth in claim 5 including a pair of normally-open switches electrically connected between opposite motor terminals and ground for alternatively switching said motor in opposite in directions.

7. A vehicle as set forth in claim 6 wherein said micro-controller is electrically connected to said switches for selectively closing each of said switches.

8. A vehicle as set forth in claim 5 including a pair of MOSFETs (metal oxide semiconductor field-effect transistors) electrically connected between opposite motor terminals and ground for alternatively switching said motor in opposite in directions.

9. A vehicle as set forth in claim 8 wherein said micro-controller is electrically connected to said MOSFETs for selectively powering each of said MOSFETs.

10. A vehicle as set forth in claim 5 including a pair of bi-polar transistors electrically connected between opposite motor terminals and ground for alternatively switching said motor in opposite in directions.

11. A vehicle as set forth in claim 10 wherein said micro-controller is electrically connected to said bi-polar transistors for selectively powering each of said bi-polar transistors.

12. A vehicle as set forth in claim 1 wherein said planar surface is a side view mirror, and said motor being a mirror positioning motor.

13. An electrical system comprising:
    a power source;
    a bi-directional wiper motor having a pair of terminals across said motor; and
    a pair of resistive elements, each resistive element attached to a window of a vehicle and electrically connected between either said power source and one of said motor terminals or one of said motor terminals and ground for receiving current and providing electrical resistance to both to warm said window and to drive said wiper motor.

14. An electrical system as set forth in claim 13 wherein said pair of resistive elements consists of a pair of defroster filament strips attached to the inside surface of said window.

15. An electrical system as set forth in claim 14 wherein said pair of defroster filament strips are electrically connected between opposite motor terminals and said power source to function as pull-up resistors.

16. A method for warming a window and driving a wiper motor in a vehicle having a power source, a bi-directional wiper motor, and at least one resistive element, the method comprising the steps of:
    attaching the at least one resistive element to the window;
    connecting the motor to the at least one resistive element; and
    selectively supplying current from the power source to the at least one resistive element to warm the window and drive the wiper motor.

* * * * *

UNITED STATES PATENT AND TRADEMARK OFFICE
CERTIFICATE OF CORRECTION

PATENT NO : 5,920,165
DATED : July 6, 1999
INVENTOR(S) : H. Winston Mane

It is certified that error appears in the above-identified patent and that said Letters Patent is hereby corrected as shown below:

On the title page, item [75], "Mane" should read --Maue--.

Signed and Sealed this

Twenty-first Day of December, 1999

Attest:

Q. TODD DICKINSON

*Attesting Officer*  *Acting Commissioner of Patents and Trademarks*